No. 769,972. PATENTED SEPT. 13, 1904.
R. H. WILES.
APPARATUS FOR PURIFYING WATER.
APPLICATION FILED MAY 27, 1904.
NO MODEL. 2 SHEETS—SHEET 1.
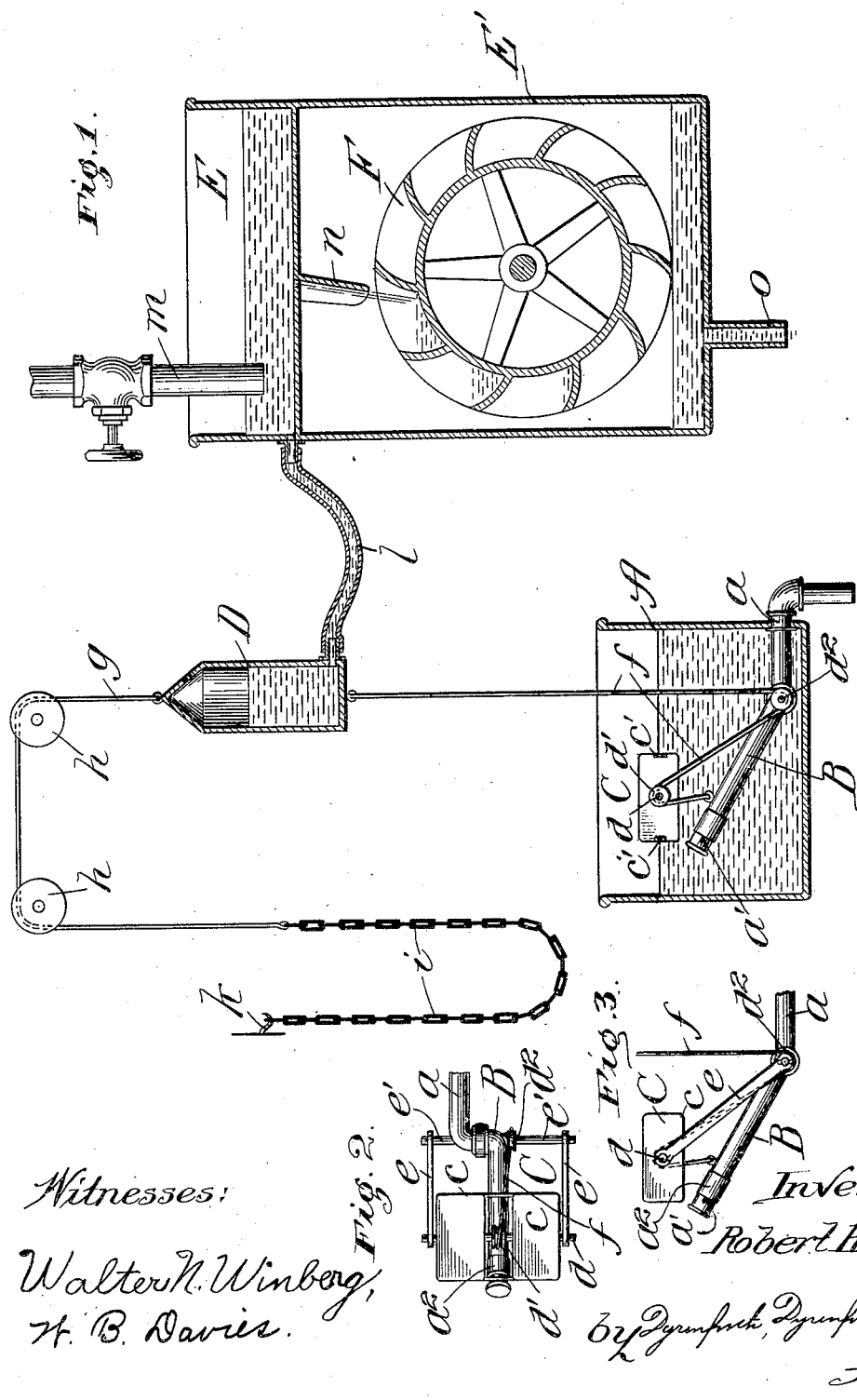

No. 769,972. PATENTED SEPT. 13, 1904.
R. H. WILES.
APPARATUS FOR PURIFYING WATER.
APPLICATION FILED MAY 27, 1904.
NO MODEL. 2 SHEETS—SHEET 2.
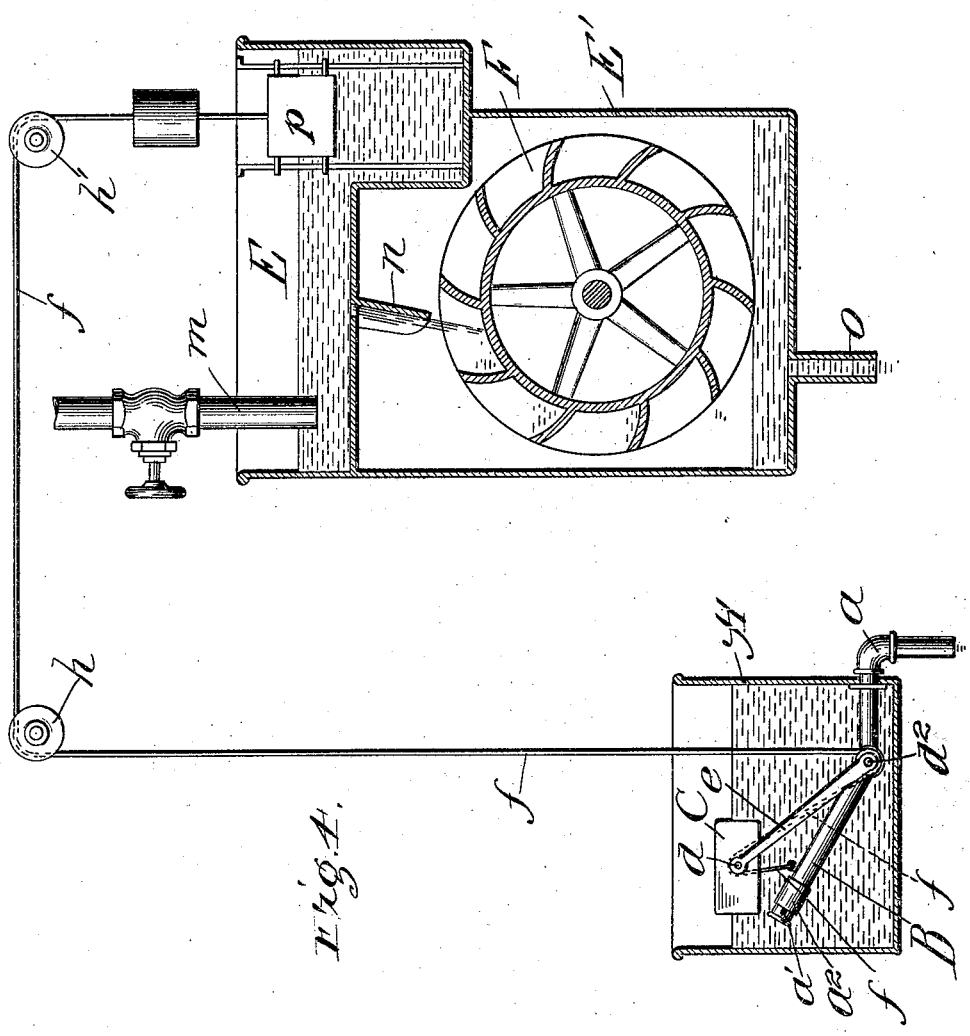
Witnesses:
Walter N. Winberg,
H. B. Davies.
Inventor:
Robert H. Wiles,
by Dyrenforth, Dyrenforth & Lee,
Attys.

No. 769,972. Patented September 13, 1904.

UNITED STATES PATENT OFFICE.

ROBERT H. WILES, OF CHICAGO, ILLINOIS, ASSIGNOR TO KENNICOTT WATER SOFTENER COMPANY, OF CHICAGO, ILLINOIS, A CORPORATION OF ILLINOIS.

APPARATUS FOR PURIFYING WATER.

SPECIFICATION forming part of Letters Patent No. 769,972, dated September 13, 1904.

Application filed May 27, 1904. Serial No. 210,053. (No model.)

*To all whom it may concern:*

Be it known that I, ROBERT H. WILES, a citizen of the United States, residing at Chicago, in the county of Cook and State of Illinois, have invented a new and useful Improvement in Apparatus for Purifying Water, of which the following is a specification.

My invention relates to an improvement in the means employed in apparatus for "softening" or purifying water by mixing with it one or more chemicals in solution for automatically maintaining a constant relation between the flow of unpurified water and the flow of chemical solution to be mixed with it. Means for this purpose are shown and described in United States Patent No. 665,606, dated January 8, 1901, to Cass L. Kennicott; and other means for the same purpose are shown and described in my application, Serial No. 201,427, filed April 4, 1904. In each of the two apparatus referred to there is provided for holding the supply of the chemical solution a reservoir which discharges into the chemical-solution tank or holder and the discharge from which is automatically regulated by a float-valve to maintain in the tank a constant level.

The primary object of my invention is to overcome the necessity for maintaining a constant level in the solution-tank, and thus enable the reservoir and its discharge-controlling-valve mechanism to be wholly dispensed with by causing the uniformity of flow from the solution-tank to remain unaffected notwithstanding any change in the level of the liquid in the tank, or, in other words, by preventing any change in the level within the tank from varying the head or rate of flow therefrom.

Referring to the accompanying drawings, Figure 1 is a view in vertical sectional elevation, showing the chemical-solution tank equipped with my improvement shown to be coöperatively connected with the supply-tank of the water to be purified by the mechanism forming the subject of my aforesaid pending application for varying the head of pressure in the solution-tank in accordance with variation in the head of pressure in the raw-water-supply tank. Fig. 2 is an enlarged plan view of the float mechanism contained in the solution-tank. Fig. 3 is a view of the same in side elevation. Fig. 4 is a view like that presented by Fig. 1, but showing my improved flow-regulating mechanism in the solution-tank coöperatively connected with the supply-tank of the water to be purified by the mechanism forming the subject of the aforesaid patent, No. 665,606.

A is the chemical-solution tank, which discharges through a stationary pipe $a$ into a precipitating-tank. (Not shown.) In the tank A is a vertically-oscillating tube B, communicating at one end with the stationary pipe $a$ and having its free end closed and a slot $a'$ in the wall near its closed end. The slot may be covered to any desired extent by a sleeve $a^2$ for the purpose of setting the working size of the slot, which is the actual discharge-orifice for the solution in the tank. The bore of the pipe B is greater than the size of the slot, so that the distance to the latter from the surface of the solution in the tank constitutes the head of pressure of the solution. The tube B, which is pivotally coupled to the end of the discharge-pipe $a$ within the tank, is supported from its free end portion by a float C in the tank, preferably in the manner shown—namely, by forming the float in two sections $c\ c$, rigidly connected at their ends and spaced apart by cross-bars $c'$, with a rod $d$ extending centrally through both sections and carrying between them a pulley $d'$ and arms $e\ e$, journaled at their lower ends on trunnions $e'\ e'$, extending laterally from the axis of the pipe $a$ and tube B at their junction in the tank, these arms engaging at their upper or outer ends with the ends of the rod $d$, which project beyond the sides of the float, with which the tube is connected by a cord $f$ or other suitable flexible medium passing about the pulley $d'$ and shown as passing also about a pulley $d^2$ on a trunnion $e'$, although, so far as the operation of the float is concerned, the cord might terminate and be fastened at that point or elsewhere. As will thus be seen, whether the level of the liquid in the tank A rises under replenishment or falls with the discharge the distance from the surface to the discharge-orifice $a'$ remains constant, owing to the rise or fall of the tube B with the float C, whereby the head of pressure in the tank upon the discharge-orifice remains the same and uniformity of the flow from the tank remains unaffected notwithstanding any change in the level of the liquid. The tank thus equipped might obviously be used in a water-purifying apparatus independently of the head of pressure in the raw-water-supply-tank member of the apparatus with any suitable means employed on that supply-tank for regulating the flow therefrom in accordance with that from the chemical-solution tank. It is preferred, however, to use the two tanks in coöperative connection and in such a way that variation in the head of pressure in the supply-tank will vary the head of pressure in the solution-tank in the manner hereinafter explained.

According to the representation in Fig. 1 the cord $f$ connects the tube B from its free end with a chamber D of small diameter, suspended by means of a cord $g$, passing over pulleys $h\ h$ and engaging one end of a chain $i$, the other end of which is fastened at some stationary point, such as a hook $k$. Any upward or downward movement of the chamber D correspondingly lowers or raises the free end of the chain and correspondingly varies its weight, so that the chain serves to counterbalance the chamber. The chamber D is connected by a small flexible tube $l$ with the supply from a spout $m$ of water to be treated in a tank E, whence the water flows through a spout $n$, as over a water-wheel F in a housing E', having an outlet $o$ leading to the aforesaid precipitating-tank, and the level of water in the tank E and in the chamber D must therefore always remain the same. Any rise in the level in the tank E will produce a corresponding rise of the level in the chamber, and the increased weight of the latter will lower it, and thereby slacken the cord to permit the free end of the tube B to lower correspondingly by gravity, thus maintaining the same head of pressure in the tank B as in the tank E, all as explained in my aforesaid application. It will therefore be apparent that with a constant level in the supply-tank E any change in level within the chemical-solution tank leaves unaffected the head of pressure in the latter, because the float C will then always maintain the same distance between the surface of liquid and the discharge-orifice $a'$, and the flow from the tank A will remain uniform so long as the contents thereof extend to a height sufficient to maintain the proper distance between their surface and the discharge-orifice $a'$, thereby rendering unnecessary any reservoir for the chemical solution for maintaining a constant level in or replenishment of the solution-tank A. It will be equally apparent that the described connection between the tube B and the tank E maintains uniformity of ratio between the flow from the discharge-pipe $a$ and that from the spout $n$ because of the automatic maintenance of the same head of pressure in the chemical-solution tank and the raw-water-supply tank.

The particular construction shown and described of the float C and its connections is advantageous because of the convenience afforded by its divided form in applying to it the cord $f$ and of the effect of the swinging arms $e$ in holding it in position against movement about on the surface of the liquid, with the undesirable effect of varying the position of the point $d$ from which the cord $f$ depends.

The means illustrated in Fig. 4 for varying the head of pressure in the solution-tank with any variation thereof in the supply-tank E comprise a vertically-guided float $p$ in the last-named tank, connected by the cord $f$, passing over pulleys $h'\ h'$, with the free end of the tube B, and passing to it about the pulleys $d^2$ and $d'$. It will be apparent that the action of this mechanism is the same as that of the chamber D and its connections in maintaining correspondence between the head of pressure within the supply-tank and that in the solution-tank.

It is not necessary to my invention that the discharge from the solution-tank shall be provided in the form of the tube B and pipe $a$, inasmuch as the float is applicable for its purpose in connection with other forms of vertically-adjustable discharge-pipe in the tank A.

What I claim as new, and desire to secure by Letters Patent, is—

1. In a water-purifying apparatus, the combination with the chemical-solution tank having a discharge-outlet and containing a tube flexibly coupled at one end with said outlet to swing vertically toward its opposite end and provided with a discharge-orifice in its free end portion, of a two-part float carrying a pulley between the sections, and a cord, or the like, connected to said tube toward its free end and near its coupled end and passing over said pulley, substantially as described.

2. In a water-purifying apparatus, the combination with the chemical-solution tank having a discharge-outlet and containing a tube flexibly coupled at one end to said outlet to swing vertically toward its opposite end and provided with a discharge-orifice in its free end portion, of a float carrying a pulley, arms pivotally connecting said float with said tube and outlet at the axis of their junction, and a cord, or the like, connected to said tube toward its free end and near its coupled end and passing over said pulley, substantially as described.

3. In a water-purifying apparatus, the combination with the chemical-solution tank having a stationary discharge-pipe containing a tube flexibly coupled at one end to said pipe to swing vertically toward its opposite end and provided with a discharge-orifice in its free end portion, of trunnions extending from said pipe and tube at the axis of their coupling, a float carrying a pulley, arms connecting said float with said trunnions, and a cord, or the like, connected at its opposite ends respectively with said tube, toward its free end, and with one of said trunnions and passing over said pulley, substantially as described.

4. In a water-purifying apparatus, the combination with the chemical-solution tank having a vertically-adjustable discharge-pipe, of a float in said tank supporting the intake end of said pipe, a supply-tank for the water to be treated having an outlet, and means for varying the distance between the float and the intake end of said pipe in accordance with change of level of the water in said supply-tank, substantially as described.

5. In a water-purifying apparatus, the combination of a chemical-solution tank having a discharge-outlet and provided with a vertically-swinging tube communicating with said outlet and containing a discharge-orifice in its free end portion, a float in said tank from which said tube is suspended toward its free end, a supply-tank for the water to be treated having an outlet, and means for varying the distance between the float and said orifice in the tube in accordance with change of level of the water in said supply-tank, substantially as described.

6. In a water-purifying apparatus, the combination with the supply-tank for the water to be treated, having an outlet and a chemical-solution tank having a discharge-outlet and provided with a vertically-swinging tube communicating with said discharge-outlet and containing a discharge-orifice in its free end portion, of a float in said tank, and means for varying the head of pressure in said solution-tank, relative to said orifice, with variation of the head of pressure in said supply-tank, comprising a body supported to rise and fall with change of head in said supply-tank and having a cord, or analogous connection with the free end portion of said tube over said float, substantially as described.

7. In a water-purifying apparatus, the combination with a supply-tank for the water to be treated, having an outlet, and a chemical-solution tank having a discharge-outlet and provided with a vertically-swinging tube communicating with said discharge-outlet and containing a discharge-orifice in its free end portion, of a float in said solution-tank, a cord, or the like, secured, at one end, to said portion of the tube, passing thence over the float about a bearing at the axis of the tube, and a body supported to rise and fall with change of head in said supply-tank and with which the opposite end of said cord is connected, substantially as described.

8. In a water-purifying apparatus, the combination with a supply-tank for the water to be treated, having an outlet, and a chemical-solution tank having a discharge-pipe with a tube coupled thereto to swing vertically and containing a discharge-orifice in its free end portion, of a float in said solution-tank, arms journaled at the coupling-axis of said tube and connected with said float, a cord, or the like, secured at one end to said portion of the tube, passing thence over the float and about said axis, and a body supported to rise and fall with change of head in said supply-tank and with which the opposite end of said cord is connected, substantially as described.

9. In a water-purifying apparatus, the combination with a supply-tank for the water to be treated, having an outlet, and a chemical-solution tank having a discharge-pipe with a tube coupled thereto to swing vertically and containing a discharge-orifice in its free end portion, of a two-part float in said solution-tank carrying a pulley between the parts, arms journaled at the coupling-axis of said tube and connected with said float, a cord, or the like, secured at one end to said portion of the tube, passing thence over said pulley and about said axis, and a body supported to rise and fall with change of head in said supply-tank and with which the opposite end of said cord is connected, substantially as described.

ROBERT H. WILES.

In presence of—
   WALTER N. WINBERG,
   ALMA U. THORIEN.